(12) United States Patent
Oki

(10) Patent No.: US 7,843,443 B2
(45) Date of Patent: Nov. 30, 2010

(54) DISPLAY CONTROL APPARATUS, DISPLAY CONTROL METHOD AND PROGRAM

(75) Inventor: Mitsuo Oki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 636 days.

(21) Appl. No.: 11/754,404

(22) Filed: May 29, 2007

(65) Prior Publication Data

US 2007/0276652 A1    Nov. 29, 2007

(51) Int. Cl.
*G09G 5/00* (2006.01)

(52) U.S. Cl. .................. 345/204; 345/619; 704/8; 704/9; 715/273

(58) Field of Classification Search ........... 345/204, 345/171, 619, 649; 707/3, 4; 704/3, 8, 9; 717/105; 715/273, 780, 200, 264, 265
See application file for complete search history.

(56) References Cited

U.S. PATENT DOCUMENTS 7,495,689 B2 * 2/2009 Curtis et al. ............ 348/207.1

FOREIGN PATENT DOCUMENTS

JP        2001-142600 A    5/2001

* cited by examiner

*Primary Examiner*—Abbas I Abdulselam
(74) *Attorney, Agent, or Firm*—Rossi, Kimms, & McDowell LLP

(57) ABSTRACT

A display control apparatus that can display bitmap images in a form depending on characteristics of a language. An identifying unit identifies a display language; a management unit adapted to manage determination information for determining whether or not a lateral orientation, or a lateral display position, or a lateral traveling direction for displaying objects associated with the display language identified by the identifying unit is changed depending on the display language, for each of the objects. A determination unit adapted to determine the lateral orientation, or the lateral display position, or the lateral traveling direction with respect to the objects to be displayed, based on the display language identified by the identifying unit and the determination information managed by the management unit.

11 Claims, 17 Drawing Sheets

FIG. 7

BITMAP DISPLAY POSITION MANAGEMENT TABLE

| (BITMAP RESOURCE ID) | (DISPLAY AREA) |
|---|---|
| PAPER FEEDING METHOD BITMAP RESOURCE ID | RESOURCE ID OF OBJECT OF DISPLAY AREA OF PROCEDURE 1 : PAPER FEEDING METHOD BITMAP |
| ARROW BITMAP RESOURCE ID | RESOURCE ID OF OBJECT OF DISPLAY AREA OF ARROW |
| RESET BUTTON BITMAP RESOURCE ID | RESOURCE ID OF OBJECT OF DISPLAY AREA OF RESET BUTTON BITMAP |
| ... | ... |

BITMAP DISPLAY FLAG TABLE — 1071

| | |
|---|---|
| BITMAP RESOURCE ID 1: BITMAP LAYOUT INFORMATION 1 | 1072 |
| BITMAP RESOURCE ID 2: BITMAP LAYOUT INFORMATION 2 | 1073 |
| BITMAP RESOURCE ID 3: BITMAP LAYOUT INFORMATION 3 | 1074 |
| BITMAP RESOURCE ID 4: BITMAP LAYOUT INFORMATION 4 | 1075 |
| ... | |

1081

1082

BITMAP OF ARROW
FROM LEFT TO RIGHT
(FORWARDING)

1181

BITMAP OF ARROW
FROM RIGHT TO LEFT
(REVERSAL)

1182

PAPER FEEDING
METHOD BITMAP

1183

FIG. 17A
EXTENDED BITMAP FORMAT

| IMAGE DATA | LAYOUT ATTRIBUTE FLAG |

1141

1142

FIG. 17B
EXAMPLE OF BITMAP FORMAT FOR ARROW BITMAP

| (ARROW BITMAP IMAGE DATA) | LAYOUT ATTRIBUTE FLAG = DEPENDENT ON DISPLAY LAYOUT |

1151

FIG. 17C
EXAMPLE OF BITMAP FORMAT FOR PAPER FEEDING METHOD BITMAP

| (PAPER FEEDING METHOD IMAGE DATA) | LAYOUT ATTRIBUTE FLAG = NOT DEPENDENT ON DISPLAY LAYOUT |

OS DISPLAY LANGUAGE LAYOUT TABLE

| 1171 | OS DISPLAY LANGUAGE 1: OS DISPLAY LAYOUT INFORMATION 1 (1172) |
| | OS DISPLAY LANGUAGE 2: OS DISPLAY LAYOUT INFORMATION 2 (1173) |
| | OS DISPLAY LANGUAGE 3: OS DISPLAY LAYOUT INFORMATION 3 (1174) |
| | OS DISPLAY LANGUAGE 4: OS DISPLAY LAYOUT INFORMATION 4 (1175) |
| | ... |

DISPLAY CONTROL APPARATUS, DISPLAY CONTROL METHOD AND PROGRAM

BACKGROUND OF THE INVENTION

1. Field of the Invention

The present invention relates to a display control apparatus, a display control method, an application and an operating system adapted to display objects as user interfaces by application software, and more particularly, to a display control apparatus, a display control method and a program adapted to switchably display objects associated with multiple languages.

2. Description of the Related Art

Conventionally, application software has been realized which supports multiple languages in one application program and can switch these languages and display bitmap images as user interfaces (see Japanese Laid-Open Patent Publication (Kokai) No. 2001-142600, for example).

The application program according to this conventional art can support all languages in the world.

Incidentally, many languages are laterally written, and read in a direction from left to right (which is referred to as "normal sequence") However, some languages such as Arabic are reversely read, that is, from right to left (which is referred to as "reverse sequence"). In the case of the language which is read in the reverse sequence as described above, it is necessary to display objects such as a predetermined sequence of bitmap images in the reverse sequence, in contrast to the case of the language which is read in the normal sequence.

It should be noted that "bitmap images" referred to herein refers to the bitmap images associated with general images, except bitmap images associated with characters.

However, the application program according to the above described conventional art or an operating system (hereinafter referred to as "OS") such as Windows® cannot manage whether a sequence of bitmap images should be displayed in the normal sequence or in the reverse sequence.

SUMMARY OF THE INVENTION

The present invention provides a display control apparatus, a display control method and a program that can display bitmap images in a form depending on characteristics of a language.

In a first aspect of the present invention, there is provided a display control apparatus comprising: an identifying unit adapted to identify a display language; a management unit adapted to manage determination information for determining whether or not a lateral orientation, or a lateral display position, or a lateral traveling direction for displaying objects associated with the display language identified by the identifying unit is changed depending on the display language, for each of the objects; and a determination unit adapted to determine the lateral orientation, or the lateral display position, or the lateral traveling direction with respect to the objects to be displayed, based on the display language identified by the identifying unit and the determination information managed by the management unit.

The identifying unit, the management unit and the determination unit can be built on an application.

The identifying unit, the management unit and the determination unit can be built on an operating system adapted to manage execution of an application.

The display control apparatus can further comprising: a first storage unit adapted to store one object having only one direction of the lateral orientation, as the object indicating a direction, and a first display control unit adapted to, if a direction of a reverse orientation with respect to the direction stored in the first storage unit is determined by the determination unit with respect to the object stored in the first storage unit, read the object stored in the first storage unit and then display the read object in a laterally reversed manner.

The display control apparatus can further comprising: a second storage unit adapted to store two objects having a left direction and a right direction of the lateral orientation respectively, as the object indicating a direction, and a second display control unit adapted to read the object having a direction determined by the determination unit with respect to the objects stored in the second storage unit, from the second storage unit, and display the object.

In a second aspect of the present invention, there is provided a display control method comprising: an identifying step of identifying a display language; a management step of managing determination information for determining whether or not a lateral orientation, or a lateral display position, or a lateral traveling direction for displaying objects associated with the display language identified at the identifying step is changed depending on the display language, for each of the objects; and a determination step of determining the lateral orientation, or the lateral display position, or the lateral traveling direction with respect to the objects to be displayed, based on the display language identified at the identifying step and the determination information managed at the management step.

In a third aspect of the present invention, there is provided a program for causing a computer to execute a display control method, the display control method comprising: an identifying step of identifying a display language; a management step of managing determination information for determining whether or not a lateral orientation, or a lateral display position, or a lateral traveling direction for displaying objects associated with the display language identified at the identifying step is changed depending on the display language, for each of the objects; and a determination step of determining the lateral orientation, or the lateral display position, or the lateral traveling direction with respect to the objects to be displayed, based on the display language identified at the identifying step and the determination information managed at the management step.

According to the present invention, it is possible to display the bitmap images in the form depending on the characteristics of the language.

Further features and aspects of the present invention will become apparent from the following detailed description of exemplary embodiments with reference to the attached drawings.

BRIEF DESCRIPTION OF THE DRAWINGS

FIG. 7 is a view showing a configuration example of a bitmap display position management table included in the printer driver in FIG. 3.

FIG. 8 is a view showing a configuration example of a bitmap display flag table managed by an image display section in FIG. 3.

FIGS. 17A, 17B and 17C are views showing formats of bitmap images in the third embodiment of the present invention.

FIG. 18 is a view showing a configuration example of an OS display language layout table in the third embodiment of the present invention, which is managed by a language setting management section in FIG. 16.

DETAILED DESCRIPTION OF THE PREFERRED EMBODIMENTS

The following description of exemplary embodiments, features and aspects of the present invention is merely illustrative in nature and is in no way intended to limit the invention, its application, or uses.

Figure 1:
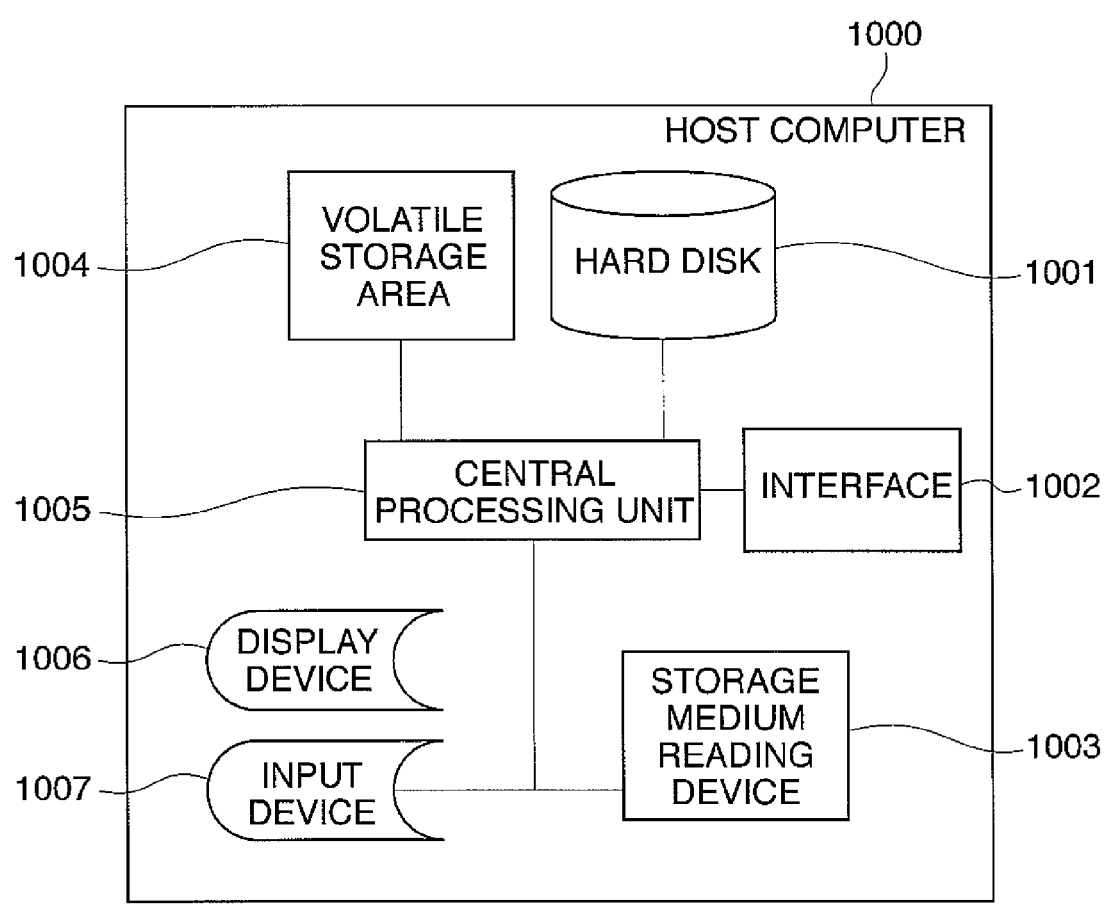
FIG. 1 is a block diagram showing a schematic configuration of a host computer applied with a display control method according to an embodiment of the present invention.

FIG. 1 is a block diagram showing a schematic configuration of a host computer applied with an image display method according to an embodiment of the present invention. In FIG. 1, a host computer 1000 has a central processing unit 1005, a hard disk 1001, an interface 1002, a storage medium reading device 1003, a volatile storage area 1004, a display device 1006 and an input device 1007.

Figure 2:
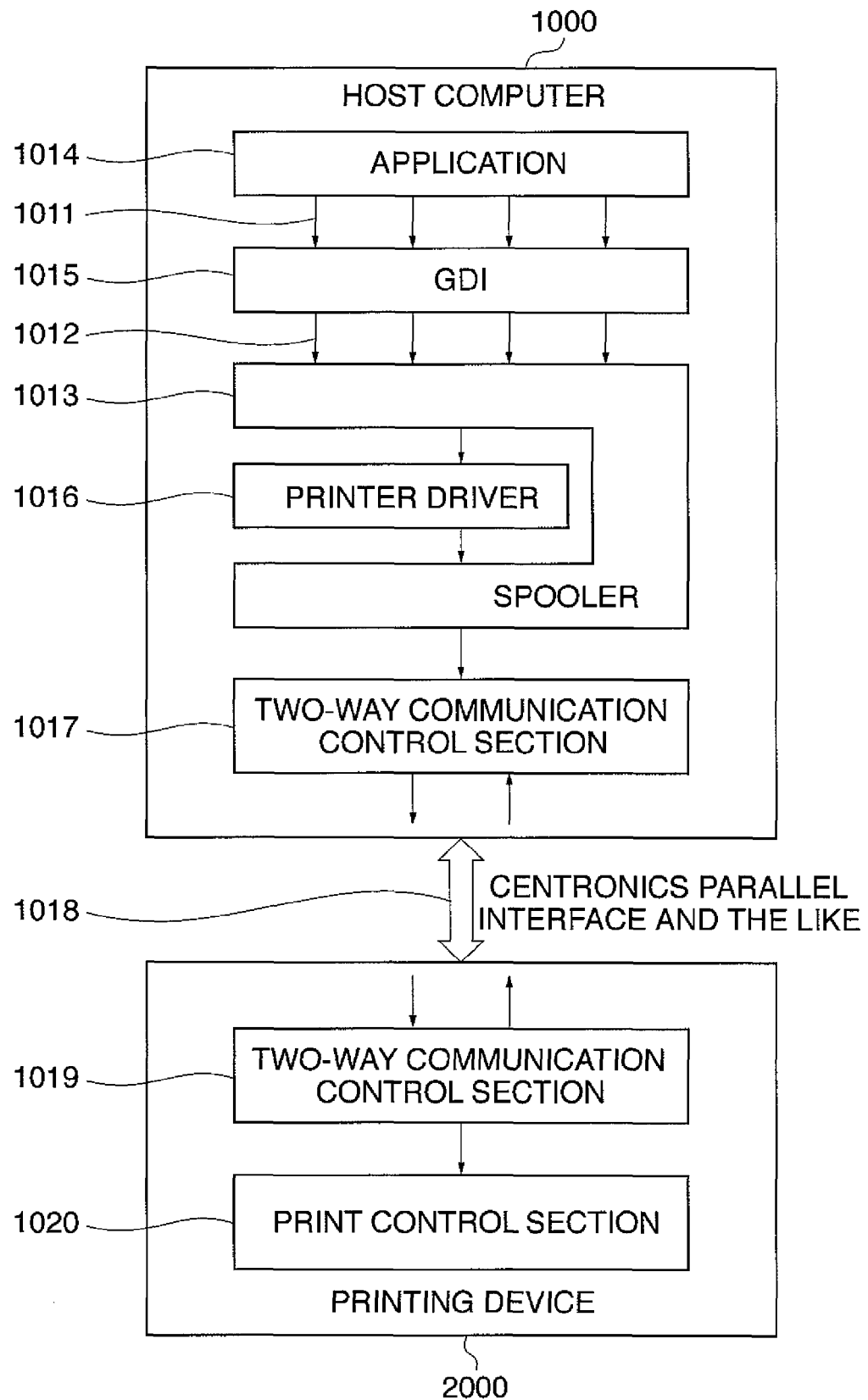
FIG. 2 is a view showing a configuration of software associated with a printer driver installed in a hard disk in FIG. 1.

The hard disk 1001 is used as a storage medium which stores an operating system, and various application programs for creating and editing documents and images, and the like. Moreover, a printer driver 1016 described below with reference to FIG. 2 is also installed in the hard disk 1001. The interface 1002 functions as an interface for sending a print instruction outputted to the outside from the host computer 1000, to a printing device 2000 (see FIG. 2). Specifically, the interface 1002 is configured with a parallel interface, a USB interface, an infrared communication, a network interface or the like.

The storage medium reading device 1003 is a device which reads information stored in storage media such as a CD-ROM and a floppy (registered trademark) disk. Specifically, the storage medium reading device 1003 is configured with a CD-ROM drive, a floppy (registered trademark) disk drive and the like. The volatile storage area 1004 is formed on a volatile memory such as a RAM. This volatile storage area 1004 is used as an area for temporarily expanding the operating system and the various application programs such as the printer driver which are stored in the hard disk 1001, and executing them by the central processing unit 1005.

The central processing unit 1005 controls general operations of the host computer 1000 according to the programs. The display device 1006 is used for displaying a user interface (hereinafter referred to as "UI") screen and the like associated with the various programs such as the printer driver. The input device 1007 is configured with a mouse, a keyboard and the like, and used for inputting data or commands with respect to the UI screen displayed on the display device 1006. It should be noted that predetermined bitmap images (objects) are displayed in a normal sequence or a reverse sequence, depending on the kind of a language.

A display control method according to a first embodiment of the present invention manages whether the predetermined bitmap images are displayed in the normal sequence or the reverse sequence, at the application side.

FIG. 2 shows a configuration example of software in the case of performing a printing process by using the printer driver installed in the hard disk 1001 in FIG. 1. In FIG. 2, the host computer 1000 and the printing device 2000 are connected with a communication cable 1018 associated with the Centronics interface, the USB interface, the network interface and the like, and can perform two-way communication. It should be noted that the host computer 1000 and the printing device 2000 may be configured so that they can perform wireless communication such as the infrared communication.

In FIG. 2, for example, it is assumed that an application 1014 with which the documents or the images can be created or edited has issued a print instruction 1011 to a graphics driver interface (hereinafter referred to as "the GDI") 1015. In this case, the GDI 1015 issues a device driver interface (hereinafter referred to as "DDI") instruction with respect to the printer driver 1016 via a spooler 1013. The printer driver 1016, which has received the DDI instruction, converts the DDI instruction into a print command which is executable by the printing device 2000, and passes the print command to a two-way communication control section 1017 via the spooler 1013.

The two-way communication control section 1017 sends the print command to a two-way communication control section 1019 in the printing device 2000 via the communication cable 1018. Similarly, the two-way communication control section 1019 in the printing device 2000 passes the print command received via the communication cable 1018 to a print control section 1020. The print control section 1020 executes the printing process associated with the print command.

Figure 3:
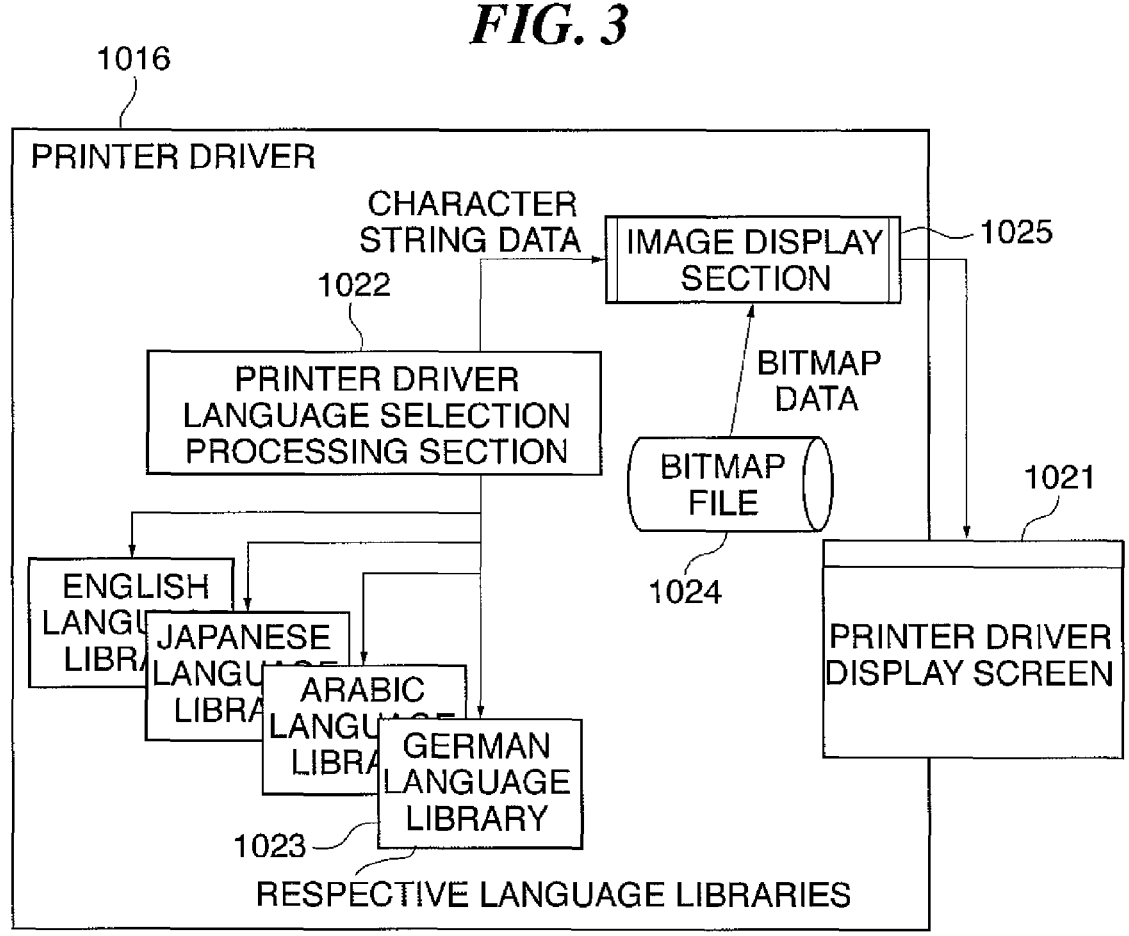
FIG. 3 is a view showing a configuration of the printer driver of FIG. 2.

FIG. 3 is a view showing a configuration of the printer driver 1016 of FIG. 2. It should be noted that this printer driver 1016 is configured as a multiple language support printer driver which supports multiple display languages.

In FIG. 3, the printer driver 1016 retains language libraries 1023 associated with multiple languages. A printer driver language selection processing section 1022 selects the language library 1023 corresponding to the display language selected by a user. When this process of selecting the language library 1023 has been performed, an image display section 1025 displays a driver setting screen and the like on which the bitmap images are displayed in the normal sequence or the reverse sequence corresponding to the display language associated with the selection, on a printer driver display screen 1021.

Figure 10:
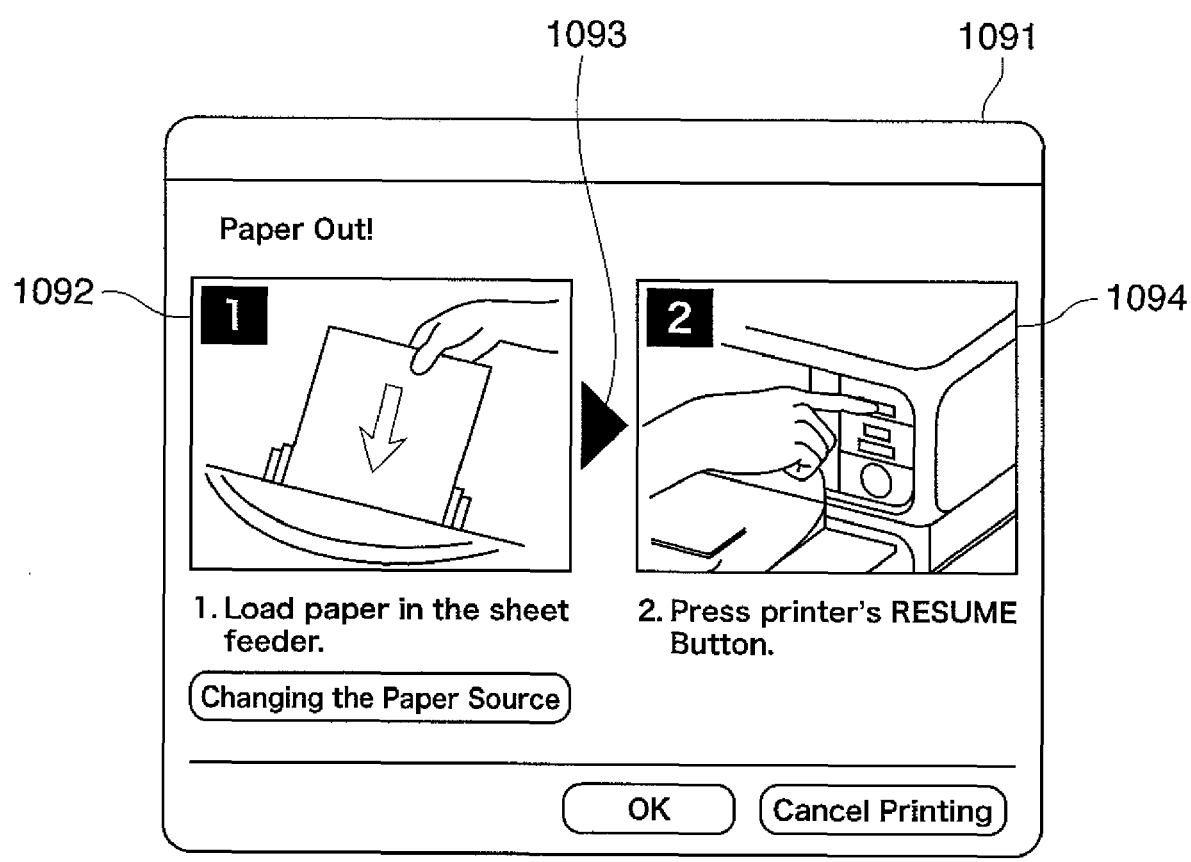
FIG. 10 is a view showing an example of a display language switching screen on the printer driver.

It should be noted that the printer driver 1016 has a function for displaying a language selection menu screen 1111 for setting to switch the display language, as shown in FIG. 10. Moreover, if the image display section 1025 of the printer driver 1016 displays the bitmap images associated with the driver setting screen and the like, the image display section 1025 obtains data for those bitmap images from a bitmap file 1024.

The language libraries 1023 shown in FIG. 3 are configured as commonly known dynamic link libraries (DLL files), and have an English language library, a Japanese language library, an Arabic language library, a German language library and the like.

Figure 4:
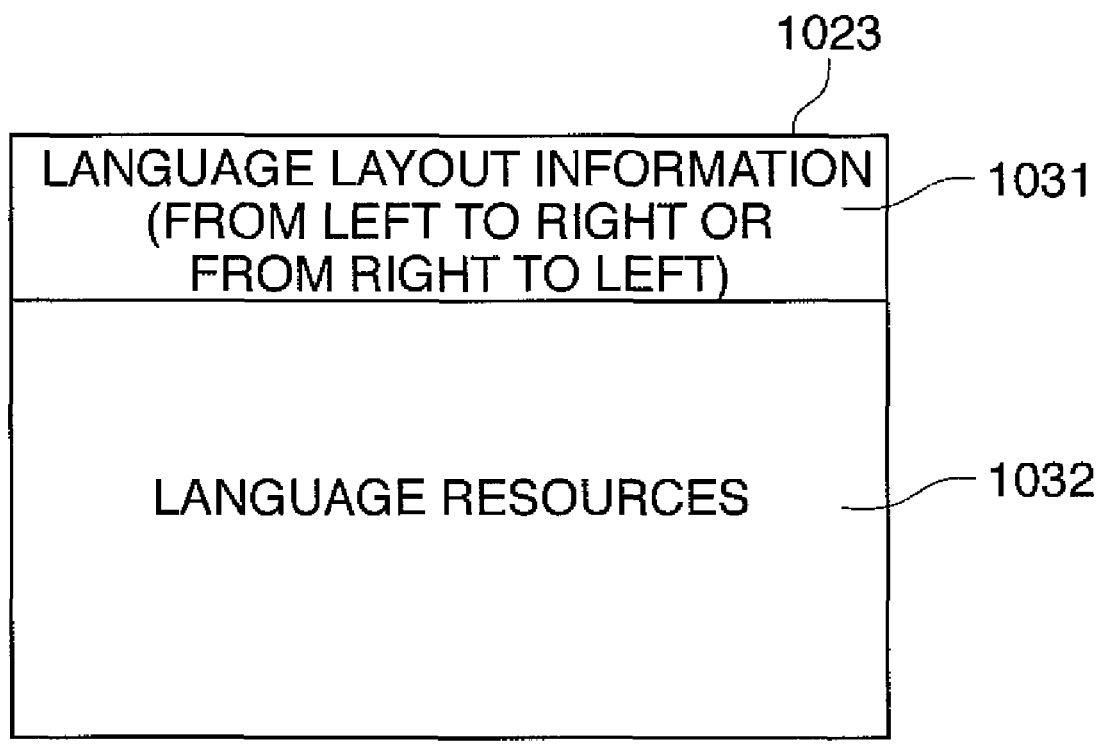
FIG. 4 is a view showing a configuration of language libraries in FIG. 3.

As shown in FIG. 4, the language libraries 1023 associated with these languages have language layout information 1031, in addition to general language resources 1032 such as characters or dialogue templates. This language layout information 1031 is information indicating whether character strings associated with the above described language are read in the normal sequence (from left to right) or the reverse sequence (from right to left). As described later, this language layout information 1031 is used for determining a lateral orientation, or a lateral display position, or a lateral traveling direction, with respect to the object such as the bitmap image or the like to be displayed.

Specifically, the language layout information 1031 is configured with a flag. For example, the flag is "1" in the case of the language such as English in which the character strings are read in the normal sequence (from left to right), or "0" in the case of the language such as Arabic in which the character strings are read in the reverse sequence. This flag associated with the language layout information 1031 can be set when the language libraries 1023 are created.

Figure 5:
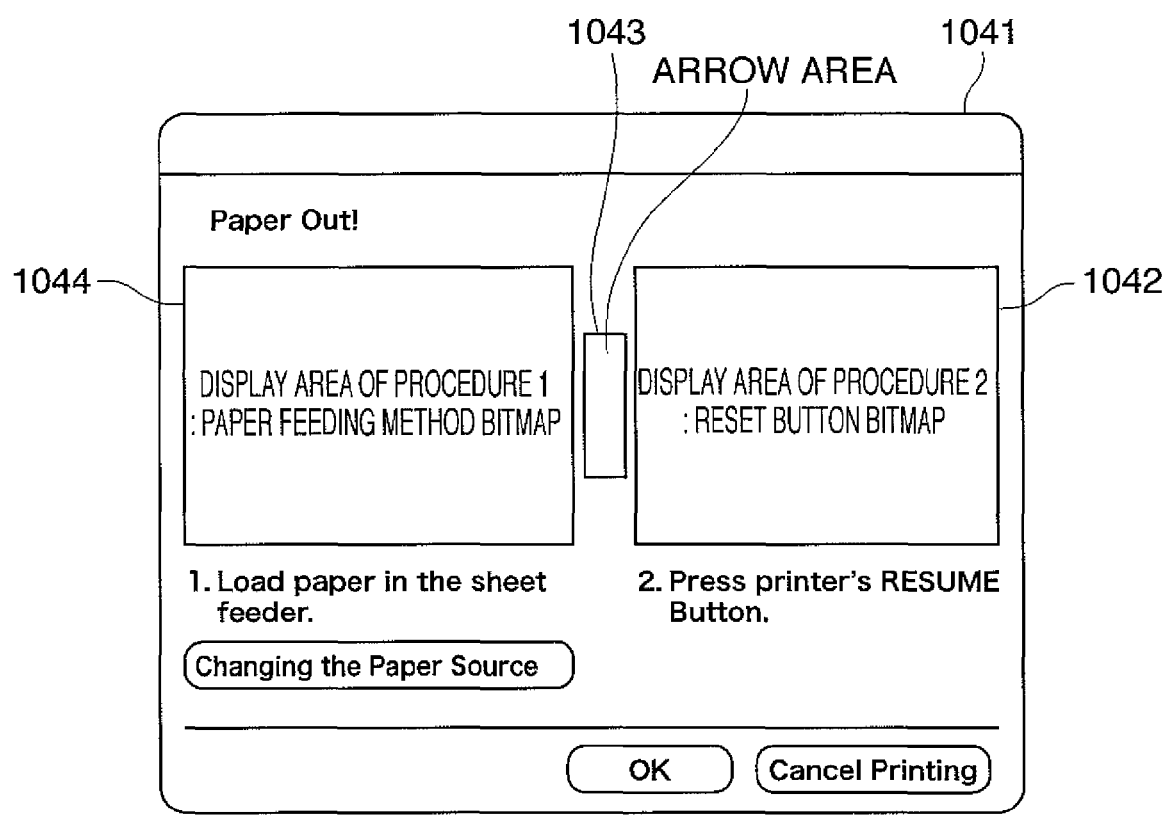
FIG. 5 is a view illustrating a dialog template associated with an English language library which is one of the language libraries of FIG. 4.

FIG. 5 is a view showing the dialog template associated with the English language library which is one of the language libraries 1023 of FIG. 4. In FIG. 5, among English language resources retained by the English language library, a dialogue template 1041 is displayed by the printer driver 1016, in which a screen of the entire dialogue, and display areas of the bitmap images associated with the character strings, buttons, pictures showing contents of an operating procedure and the like which are displayed on the screen, are specified.

For example, in the dialogue template 1041, as Procedure 1 associated with the printing, an area 1044 for displaying a bitmap image showing a paper feeding method is specified. Furthermore, in the dialogue template 1041, an arrow area 1043 for displaying the procedure with an arrow, and as Procedure 2 associated with the printing, an area 1042 for displaying a bitmap image showing a reset button are specified.

In other words, this dialogue template 1041 configures the English language resources in which the character strings are read "from left to right". Therefore, the display area of Procedure 1 is on the left and the display area of Procedure 2 is on the right, that is, Procedures 1 and 2 are configured to be displayed in an arrangement which brings no feeling of strangeness. In other words, since a reading direction of English is "from left to right", depending on its direction, the lateral traveling direction of the bitmap images associated with Procedures 1 and 2 is also "from left to right".

In this way, the display areas of the respective bitmap images are specified in the templates on the respective language resources (language libraries).

Figure 6:
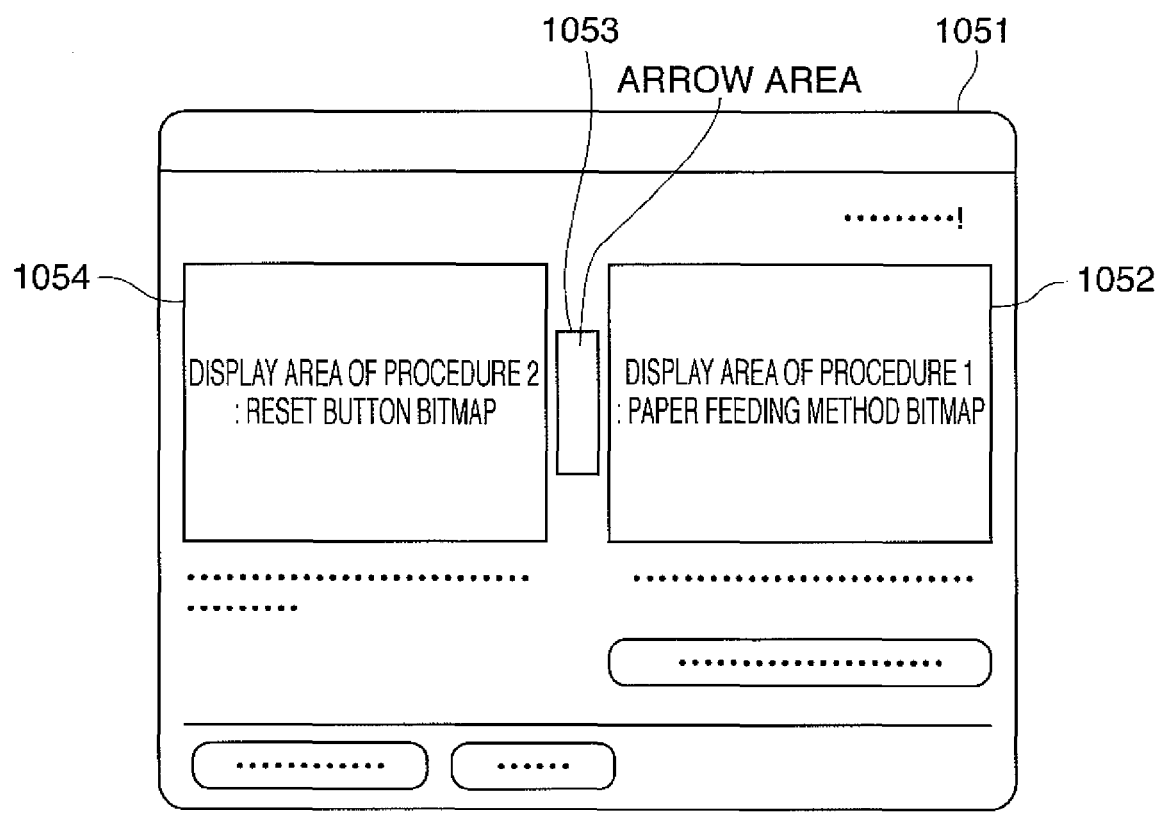
FIG. 6 is a view illustrating a dialog template associated with an Arabic language library which is one of the language libraries.

FIG. 6 is a view showing a dialog template associated with the Arabic language library which is one of the language libraries 1023. In FIG. 6, among Arabic language resources retained by the Arabic language library, a dialogue template 1051 corresponds to the dialogue template 1041 of FIG. 5, in which an area 1052 for displaying the bitmap image showing the paper feeding method as Procedure 1 associated with the printing, and an arrow area 1053 for displaying the procedure with the arrow are specified. Furthermore, in the dialogue template 1051, as Procedure 2 associated with the printing, an area 1054 for displaying the bitmap image showing the reset button is specified.

In other words, this dialogue template 1051 configures the Arabic language resources in which the character strings are read from right to left. Therefore, the display area of Procedure 1 is on the right and the display area of Procedure 2 is on the left, that is, Procedures 1 and 2 are configured to be displayed in an arrangement which brings no feeling of strangeness.

In addition to the templates, the display areas of the bitmap images as described above are also managed in a bitmap display position management table 1061 as shown in FIG. 7. This bitmap display position management table 1061 associates the bitmap images to be displayed, with bitmap resource IDs indicating their existing locations, and manages resource IDs of objects indicating display areas 1062 of the bitmap images on the template.

It should be noted that the above described resource IDs of the objects refers to IDs of the display areas set as bases on the template.

In an example of FIG. 7, a resource ID of the object 1063 is associated with a bitmap resource ID associated with the paper feeding method. Moreover, a resource ID of the object 1064 is associated with a bitmap resource ID associated with the arrow. Furthermore, a resource ID of the object 1065 is associated with a bitmap resource ID associated with the reset button. In this way, with respect to the objects related to the printing, the bitmap display position management table 1061 is included in the printer driver 1016. Moreover, with respect to the objects related to the creating or the editing of the documents or the images, a similar bitmap display position management table is included in the application 1014.

Specifically, in the printer driver 1016, XY coordinates, width and height of each object area in which the object is arranged have been specified as resource information, on the template associated with the dialogue screen (UI screen) on each of the language resources. On the other hand, in the bitmap display position management table 1061, the bitmap resource IDs indicating the existing locations of the bitmap images to be displayed, and the resource IDs of the objects indicating the display areas 1062 of the bitmap images on the template have been managed.

In this case, for example, the resource ID of the same object has been assigned to the display area 1044 associated with Procedure 1 on the template of FIG. 5 and the display area 1052 associated with Procedure 1 on the template of FIG. 6. According to the above described configuration, the application can read the bitmap images associated with the dialogue screen from the bitmap file 1024, and display the bitmap images at predetermined positions.

FIG. 8 is a view showing a configuration example of a bitmap display flag table managed by the image display section 1025 in FIG. 3. In FIG. 8, a bitmap display flag table 1071 manages "bitmap layout information" with respect to the bitmap resource IDs with which the respective bitmap images can be uniquely identified. Each of bitmap layout information 1072, 1073, 1074 and 1075 on this bitmap display flag table 1071 is configured with a flag indicating whether or not the corresponding bitmap image is dependent on a display layout.

Figure 9A:
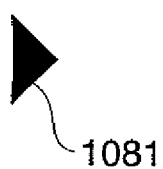
FIGS. 9A and 9B are views illustrating original bitmap images retained in a bitmap file.
Figure 9B:
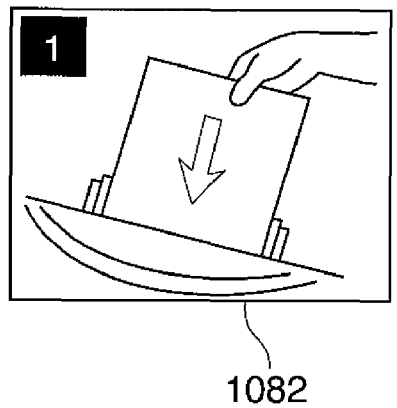

For example, a bitmap image 1081 associated with a black colored arrow shown in FIG. 9A and a bitmap image 1082 showing the paper feeding method with respect to a printer shown in FIG. 9B show original bitmap images retained in the bitmap file 1024.

Among these images, with respect to the bitmap image 1081 associated with the black colored arrow, its orientation is required to be changed depending on a reading direction depending on the kind of the language. Therefore, with respect to the bitmap image 1081, for example, "1" indicating that the bitmap image is dependent on the display layout has been set as the flag associated with the above described bitmap layout information.

On the other hand, with respect to the bitmap image 1082 showing the paper feeding method with respect to the printer, it is sufficient only if its display position has been specified on the dialogue template, and its lateral orientation is not required to be changed depending on the reading direction depending on the kind of the language. Therefore, with respect to the bitmap image 1082, for example, "0" indicating that the bitmap image is not dependent on the display layout has been set as the flag associated with the above described bitmap layout information.

As can be inferred from the above description, it should be noted that whether or not the bitmap image is dependent on "display layout" indicates whether or not the bitmap image is dependent on "language layout information 1031" of FIG. 4.

Figure 11:
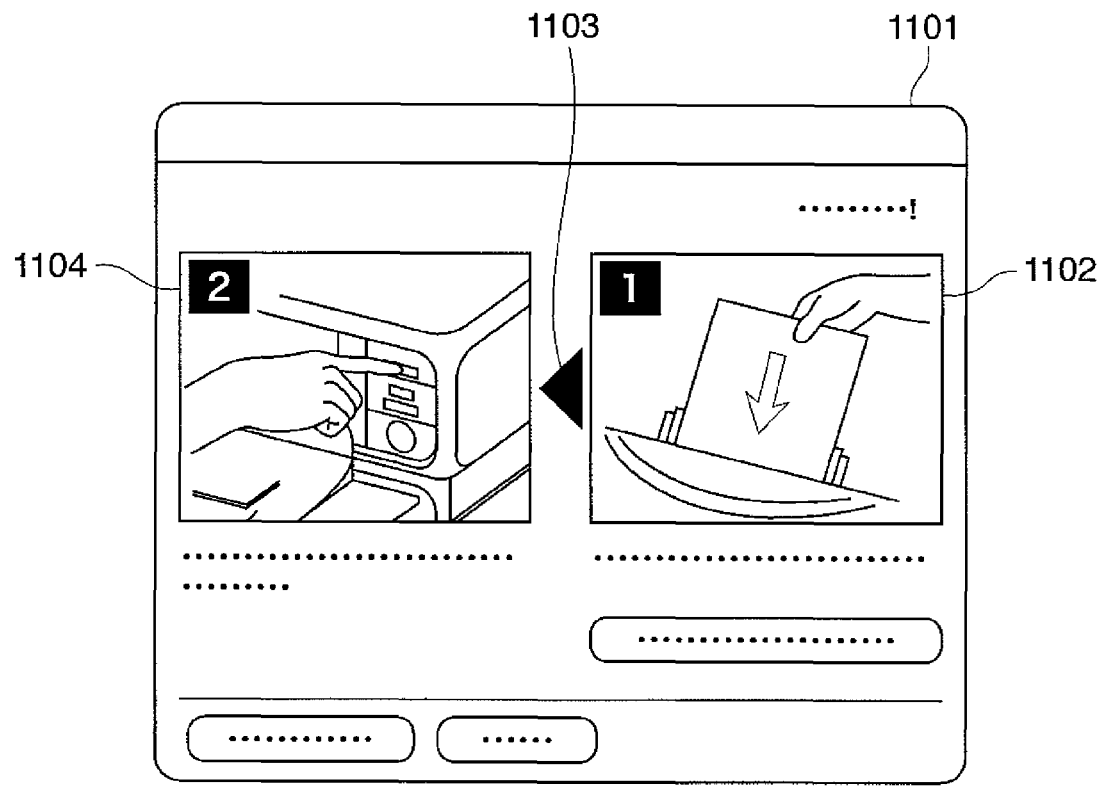
FIG. 11 is a view showing a recovery guidance screen displayed when a printer is out of paper, if "English" has been specified on the language switching screen shown in FIG. 10.

FIG. 11 is a view showing a recovery guidance screen displayed when the printer is out of paper, if "English" has been specified on the language selection menu screen 1111 shown in FIG. 10. In FIG. 11, a recovery guidance screen 1091 corresponds to the dialogue template 1041 of FIG. 5. On this recovery guidance screen 1091, bitmap images 1092 and 1094 visually showing Recovery procedures 1 and 2, and a bitmap image 1093 associated with a black colored, right-pointing arrow are displayed along with character string information describing the recovery procedures.

In this case, since "English" has been specified in which the character strings are read from left to right, the respective bitmap images are displayed so that they travel from left to right. In other words, the bitmap image 1092 showing Recovery procedure 1, the bitmap image 1093 associated with the black colored, right-pointing arrow, and the bitmap image 1094 showing Recovery procedure 2 are arranged from left to right in this sequence and displayed.

Figure 12:
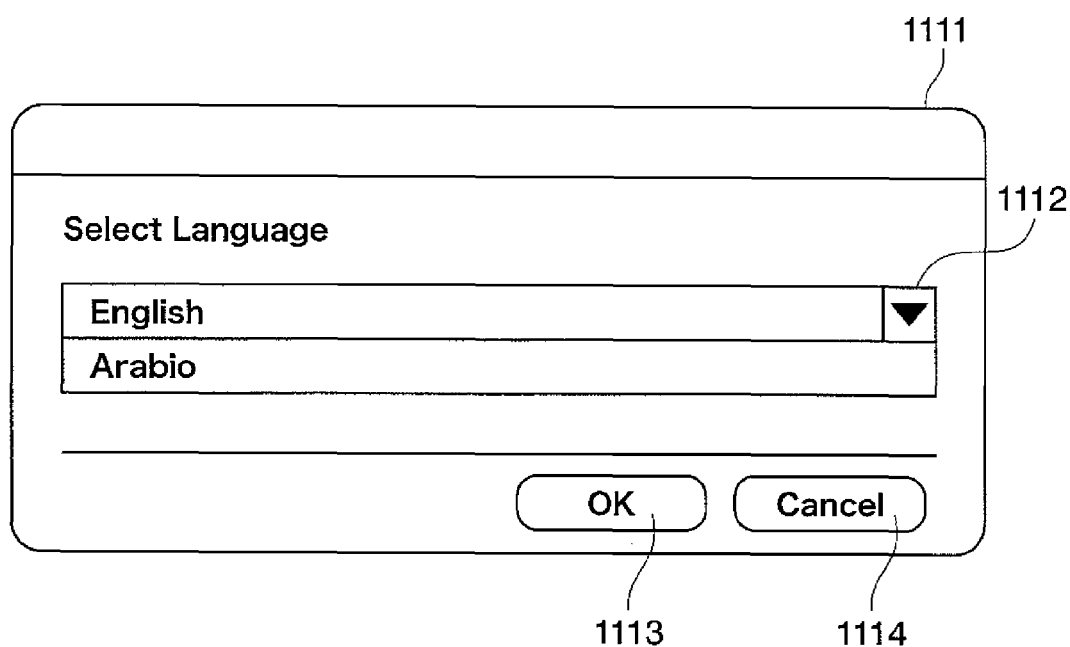
FIG. 12 is a view showing a recovery guidance screen displayed when the printer is out of paper, if "Arabic" has been specified on the language switching screen shown in FIG. 10.

FIG. 12 is a view showing a recovery guidance screen displayed when the printer is out of paper, if "Arabic" has been specified on the language selection menu screen 1111 shown in FIG. 10. In FIG. 12, a recovery guidance screen 1101 corresponds to the dialogue template 1051 of FIG. 6. On this recovery guidance screen 1101, bitmap images 1102 and 1104 visually showing Recovery procedures 1 and 2, and a bitmap image 1103 associated with a black colored, left-pointing arrow are displayed along with the character string information describing the recovery procedures.

In this case, "Arabic" has been specified in which the character strings are read from right to left. Therefore, the respective bitmap images are displayed so that they travel from right to left. In other words, the bitmap image 1102 showing Recovery procedure 1, the bitmap image 1103 associated with the black colored, left-pointing arrow, and the bitmap image 1104 showing Recovery procedure 2 are arranged from right to left in this sequence and displayed.

It should be noted that the bitmap image 1103 associated with the black colored, left-pointing arrow is displayed by laterally reversing the bitmap image 1081 associated with the original black colored, right-pointing arrow of FIG. 9A and displaying it. This laterally reversed display process is performed based on the language layout information 1031 on the Arabic language library, and the bitmap layout information on the bitmap display flag table 1071.

Next, an image display process in the first embodiment will be described below.

Figure 13:
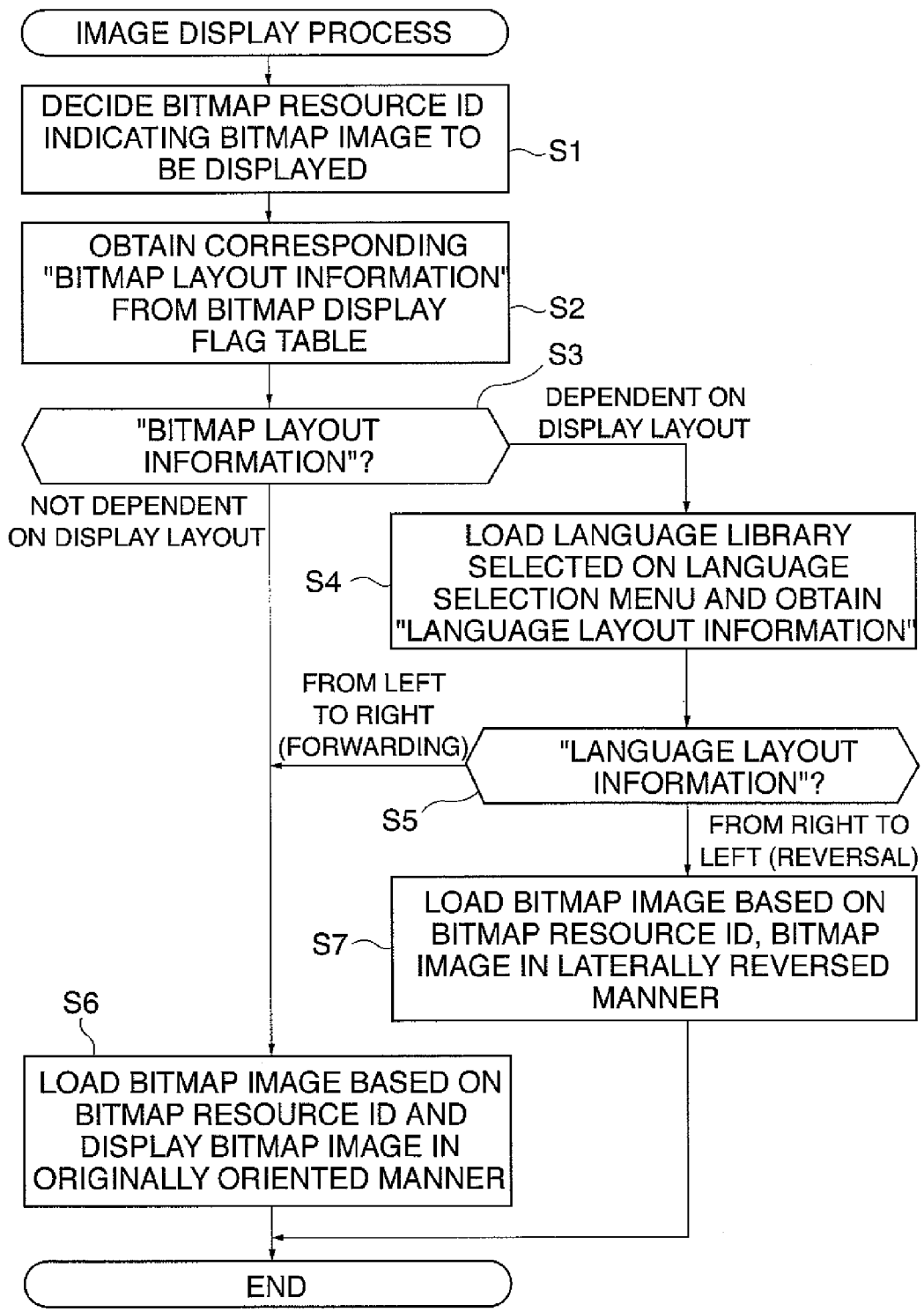
FIG. 13 is a flowchart showing the procedure of an image display process in a first embodiment of the present invention, which is executed by a central processing unit in FIG. 1.

FIG. 13 is a flowchart showing the procedure of the image display process in the first embodiment of the present invention, which is executed by the central processing unit 1005 in FIG. 1. A program associated with this flowchart has been configured as the image display section 1025 within the printer driver 1016 and recorded in the storage medium, and is expanded by the volatile storage area 1004 and executed by the central processing unit 1005 (the same also applies to FIG. 15 described later).

In FIG. 13, first, when an event in which the bitmap image should be displayed occurs in execution of the printer driver 1016, the central processing unit 1005 decides the bitmap resource ID indicating the bitmap image to be displayed on the printer driver display screen 1021 (step S1). Next, the central processing unit 1005 obtains "bitmap layout information" with respect to the above described bitmap resource ID from the bitmap display flag table 1071 shown in FIG. 8 (step S2).

Then, by determining the flag associated with that "bitmap layout information", the central processing unit 1005 determines whether or not the display of the above described bitmap image is "dependent on the display layout" (step S3). As its result, if the display of the above described bitmap image is "not dependent on the display layout", the central processing unit 1005 loads the corresponding bitmap image from the bitmap file 1024 based on the bitmap resource ID. Then, the central processing unit 1005 displays the loaded bitmap image in an originally oriented manner on the printer driver display screen 1021 (step S6), followed by terminating this process.

On the other hand, as a result of the determination in step S3, if the display of the above described bitmap image is "dependent on the display layout", the central processing unit 1005 loads the language library associated with the language selected on the language selection menu screen 1111 of FIG. 10. Then, the central processing unit 1005 obtains the language layout information 1031 of FIG. 4 from the loaded language library (step S4). This loading of the language library is executed based on the printer driver language selection processing section 1022 (FIG. 3). Moreover, as described above, the language layout information 1031 describes whether the language has a language layout of being read from left to right or a language layout of being read from right to left.

Then, if the above described language layout information 1031 indicates the language layout of "from left to right (normal sequence: forwarding)", the central processing unit 1005 loads the corresponding bitmap image from the bitmap file 1024 based on the bitmap resource ID. Then, the central processing unit 1005 displays the bitmap image in an originally oriented manner on the printer driver display screen 1021 (step S6), followed by terminating this process.

On the other hand, as a result of the determination in step S5, if the above described language layout information 1031 indicates the language layout of "from right to left (reverse sequence: reversal)", the central processing unit 1005 loads the corresponding bitmap image from the bitmap file 1024 based on the bitmap resource ID. Then, the central processing unit 1005 laterally reverses the bitmap image, for example, the bitmap image 1081 associated with the black colored, right-pointing arrow of FIG. 9A, to convert its original orientation of right-pointing into left-pointing. Then the central processing unit 1005 displays the bitmap image 1081 associated with the arrow converted into left-pointing on the printer driver display screen 1021 (step S7), followed by terminating this process.

In this way, in the first embodiment of the present invention, it is possible to display the bitmap image associated with the arrow or the like for example, in the orientation corresponding to the reading direction of the language, by the application such as the printer driver 1016 alone, without depending on the operating system.

Figure 14A:
FIGS. 14A, 14B and 14C are views illustrating original bitmap images in a second embodiment of the present invention.
Figure 14B:

As described above, in the first embodiment of the present invention, only one bitmap image of right-pointing has been prepared on the bitmap file 1024, as the bitmap image associated with the black colored arrow. In contrast to this, in a second embodiment of the present invention, as shown in FIGS. 14A and 14B, two images, that is, a right-pointing image 1181 and a left-pointing image 1182 have been prepared on the bitmap file 1024, as the bitmap image associated with the black colored arrow.

Moreover, in the case of a display process in the second embodiment of the present invention, as will be described below with respect to FIG. 15, the bitmap image 1103 (FIG. 12) associated with the black colored, left-pointing arrow is displayed by using the original bitmap image 1182 (see FIG. 14B) which is left-pointing from the beginning.

It should be noted that, as the bitmap layout information on the bitmap display flag table 1071 of FIG. 8, the flag indicating that the bitmap image is dependent on "display layout" has been set to both of the above described bitmap images 1181 and 1182 associated with the right-pointing and left-pointing arrows.

Figure 14C:
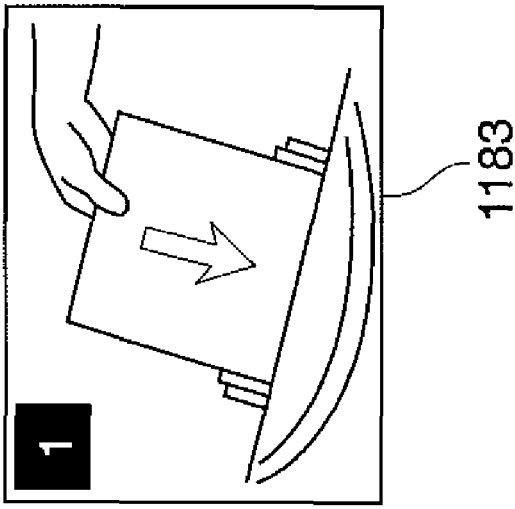

As shown in FIG. 14C, with respect to a bitmap image 1183 associated with the paper feeding method showing Procedure 1, as described above, it is sufficient only if its display position has been specified on the dialogue template, and its lateral orientation is not required to be changed depending on the reading direction depending on the kind of the language.

Therefore, also in the second embodiment of the present invention, similarly to the first embodiment of the present invention, only one bitmap image 1183 associated with the paper feeding method showing Procedure 1 has been prepared on the bitmap file 1024. Also similarly to the first embodiment of the present invention, with respect to this bitmap image 1183, the flag indicating that the bitmap image is not dependent on "display layout" has been set as its bitmap layout information on the bitmap display flag table 1071 of FIG. 8. These also apply to the bitmap image associated with Procedure 2.

Next, an image display process in the second embodiment of the present invention will be described below.

Figure 15:
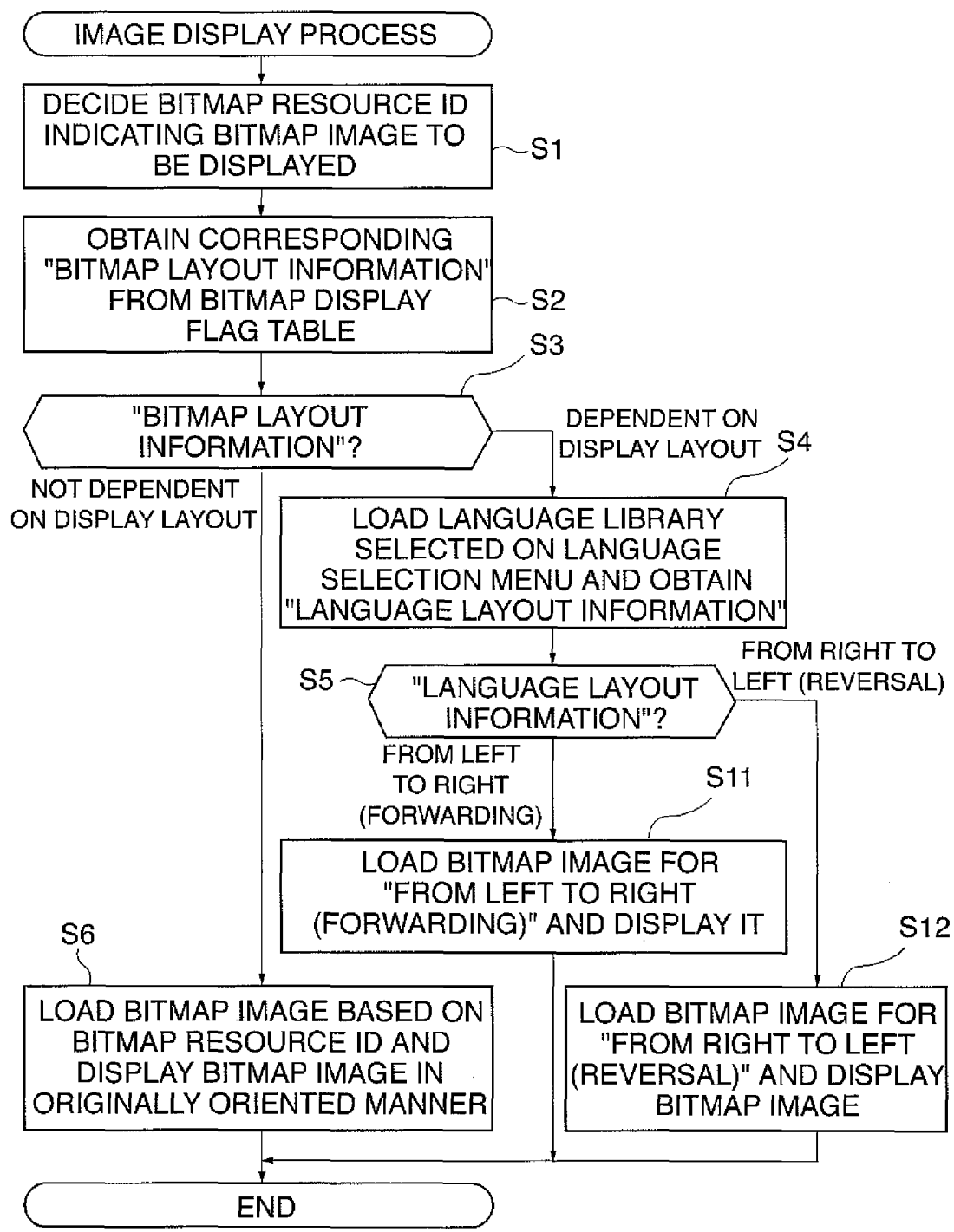
FIG. 15 is a flowchart showing the procedure of an image display process in the second embodiment of the present invention, which is executed by the central processing unit.

FIG. 15 is a flowchart showing the procedure of the image display process in the second embodiment of the present invention, which is executed by the central processing unit 1005.

In FIG. 15, first, when an event in which the bitmap image should be displayed occurs in execution of the printer driver 1016, the central processing unit 1005 decides the bitmap resource ID indicating the bitmap image to be displayed on the printer driver display screen 1021 (step S1). Next, the central processing unit 1005 obtains "bitmap layout information" with respect to the above described bitmap resource ID from the bitmap display flag table 1071 shown in FIG. 8 (step S2).

Then, by determining the flag associated with that "bitmap layout information", the central processing unit 1005 determines whether or not the display of the above described bitmap image is "dependent on the display layout" (step S3). As its result, if the display of the above described bitmap image is "not dependent on the display layout", the central processing unit 1005 loads the corresponding bitmap image from the bitmap file 1024 based on the bitmap resource ID. Then, the central processing unit 1005 displays the loaded bitmap image in an originally oriented manner on the printer driver display screen 1021 (step S6), followed by terminating this process.

On the other hand, as a result of the determination in step S3, if the display of the above described bitmap image is "dependent on the display layout", the central processing unit 1005 loads the language library associated with the language selected on the language selection menu screen 1111 of FIG. 10. Then, the central processing unit 1005 obtains the language layout information 1031 of FIG. 4 from the loaded language library (step S4). This loading of the language library is executed based on the printer driver language selection processing section 1022 (FIG. 3). Moreover, as described above, the language layout information 1031 describes whether the language has the language layout of being read from left to right or the language layout of being read from right to left.

Then, if the above described language layout information 1031 indicates the language layout of "from left to right (normal sequence: forwarding)", the central processing unit 1005 loads the bitmap image associated with "from left to right" from the bitmap file 1024. This bitmap image to be loaded is searched based on the bitmap resource ID. Then, the central processing unit 1005 displays the bitmap image associated with "from left to right", for example, the bitmap image 1181 of FIG. 14A, on the printer driver display screen 1021 (step S11), followed by terminating this process.

On the other hand, as a result of the determination in step S5, if the above described language layout information 1031 indicates the language layout of "from right to left (reverse sequence: reversal)", the central processing unit 1005 loads the bitmap image associated with "from right to left" from the bitmap file 1024. This bitmap image to be loaded is searched based on the bitmap resource ID. Then, the central processing unit 1005 displays the bitmap image associated with "from right to left", for example, the bitmap image 1182 of FIG. 14B, on the printer driver display screen 1021 (step S12), followed by terminating this process.

In this way, in the second embodiment of the present invention, similarly to the first embodiment of the present invention, it is possible to display the bitmap image associated with the arrow, in the orientation corresponding to the reading direction of the language, by the application such as the printer driver 1016 alone, without depending on the operating system. Moreover, in the second embodiment of the present invention, the bitmap images associated with the arrow in multiple orientations have been prepared. Therefore, in the second embodiment of the present invention, for example, even if Arabic has been selected, it is possible to rapidly display the bitmap image associated with the arrow in the orientation matching the reading direction of Arabic, in comparison to the first embodiment of the present invention.

As described above, in the first embodiment of the present invention, the laterally reversed display process has been performed with respect to the predetermined bitmap image, by the application such as the printer driver 1016. In contrast to this, in a third embodiment of the present invention, the laterally reversed display process is performed with respect to the predetermined bitmap image, by the operating system (OS).

Figure 16:
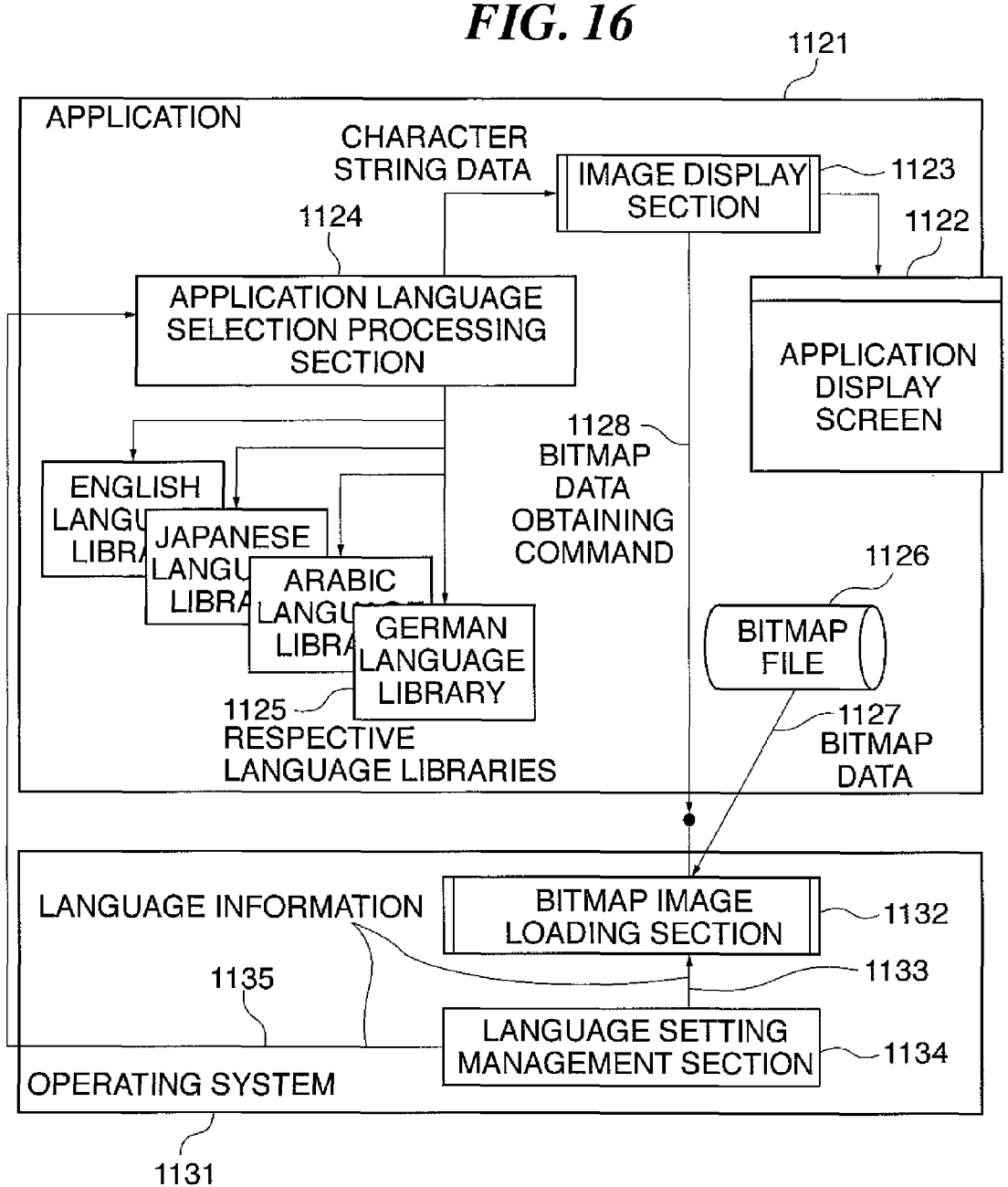
FIG. 16 is a view showing a configuration of an application and an operating system included in the hard disk in FIG. 1, in a third embodiment of the present invention.

FIG. 16 shows a configuration example of the application and the operating system included in the hard disk 1001 in FIG. 1, in the third embodiment of the present invention.

In FIG. 16, an application 1121 is configured almost similarly to the printer driver 1016 according to the first and second embodiments of the present invention shown in FIG. 3. In other words, the application 1121 has language libraries 1125 corresponding to the respective languages, and an application language selection processing section 1124 for selecting from these language libraries 1125. Moreover, the application 1121 has an image display section 1123 for displaying the bitmap images on an application display screen 1122, and a bitmap file 1126 having stored the bitmap images.

It should be noted that a configuration of the language libraries 1125 is just the same as that of the language libraries 1023 according to the first and second embodiments of the present invention. Moreover, a function of the application language selection processing section 1124 is almost equivalent to that of the printer driver language selection processing section 1022 according to the first and second embodiments of the present invention. Similarly, functions of the application display screen 1122 and the image display section 1123 are almost equivalent to those of the printer driver display screen 1021 and the image display section 1025 according to the first and second embodiments of the present invention.

However, a format of the bitmap file 1126 is somewhat different from that of the bitmap file 1024 according to the first and second embodiments of the present invention. In other words, in the format of the bitmap file 1126 according to the third embodiment of the present invention, for example, as shown in FIGS. 17A, 17B and 17C, a layout attribute flag 1142 is attached with respect to each of bitmap images 1141, 1151 and 1161.

This layout attribute flag 1142 indicates whether or not the bitmap image is "dependent on the display layout", and corresponds to the bitmap layout information in the bitmap display flag table 1071 of FIG. 8. Therefore, in the third embodiment of the present invention, the bitmap display flag table 1071 is not provided. Moreover, the image display section 1123 according to the third embodiment of the present invention does not manage the bitmap display flag table 1071, unlike with the image display section 1025 according to the first and second embodiments of the present invention.

Moreover, as shown in FIG. 16, an OS 1131 according to the third embodiment of the present invention has a bitmap image loading section 1132 and a language setting management section 1134, unlike with the OS (not shown) according to the first and second embodiments of the present invention.

When a command for obtaining a predetermined bitmap image is issued from the image display section 1123, the bitmap image loading section 1132 loads that bitmap image from the bitmap file 1126 and returns it to the image display section 1123. In this case, the bitmap image loading section 1132 obtains language information 1133 from the language setting management section 1134. Then the bitmap image loading section 1132 laterally reverses the bitmap image depending on the language information 1133 and returns it.

In other words, the language setting management section 1134 manages the display language selected by the user. Furthermore, the language setting management section 1134 manages an OS display language layout table 1171 shown in FIG. 18. This OS display language layout table 1171 retains OS display layout information 1172 to 1175 corresponding to OS display languages associated with the respective languages. Specifically, the OS display layout information 1172 to 1175 is flag information indicating whether the OS display language is an OS display language of "from left to right (forwarding)" such as English or an OS display language of "from right to left (reversal)" such as Arabic.

Therefore, the language setting management section 1134 can determine whether the language layout of the OS display language currently selected by the user is the OS display language of "from left to right (forwarding)" or the OS display language of "from right to left (reversal)", and manage the OS display language.

It should be noted that, in the third embodiment of the present invention, the application language selection processing section 1124 obtains language information 1135 from the language setting management section 1134. Then, based on the language information 1135, the application language selection processing section 1124 selects the language library 1125 associated with the language corresponding to the currently selected OS display language. In other words, the third embodiment of the present invention has a configuration in which the display language of the user interface screen on the side of the application 1121 is also similarly switched by switching the display language on the side of the OS 1131.

Next, an image display process in the third embodiment of the present invention will be described below.

Figure 19:
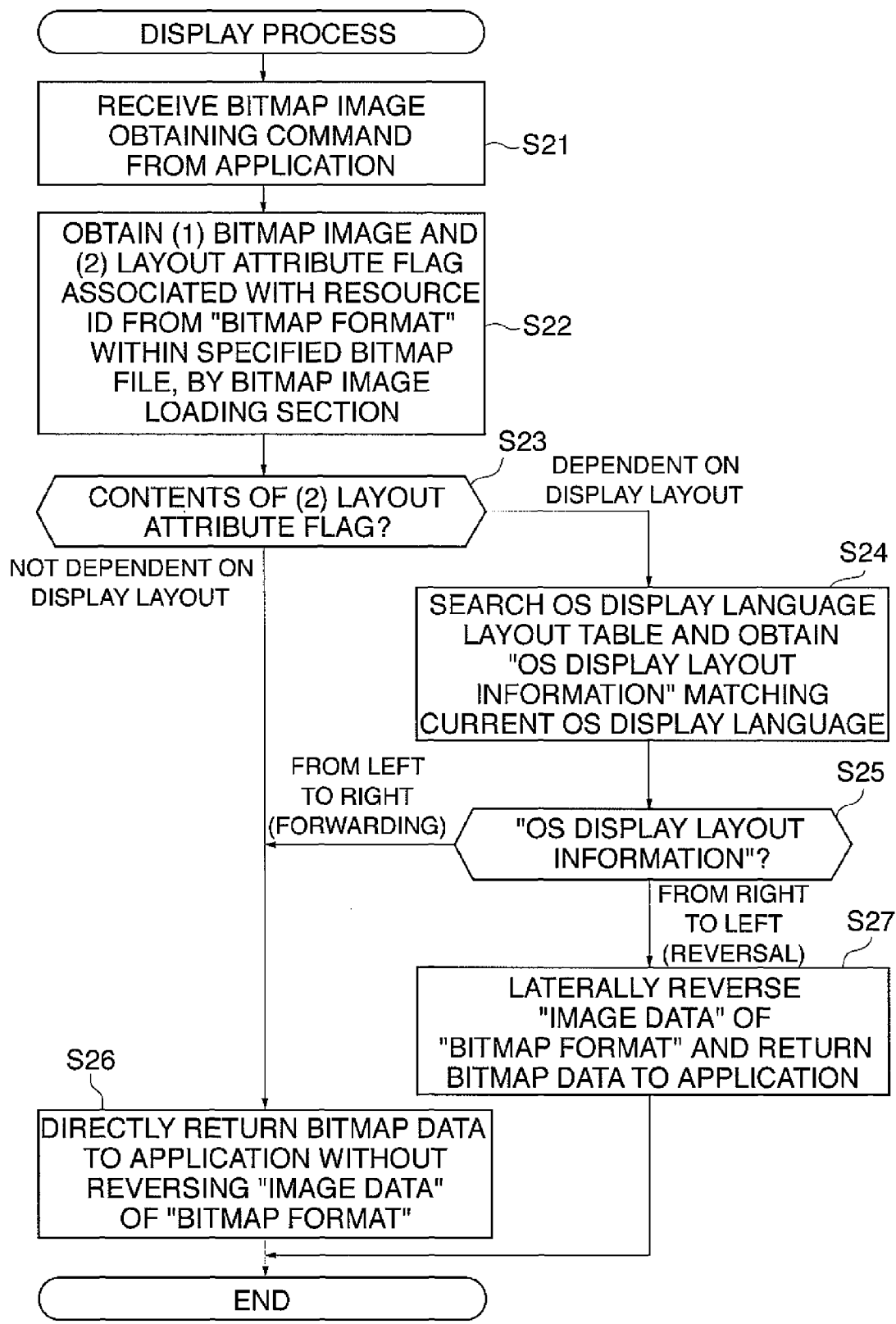
FIG. 19 is a flowchart showing the procedure of an image display process in the third embodiment of the present invention, which is executed by the central processing unit.

FIG. 19 is a flowchart showing the procedure of the image display process in the third embodiment of the present invention, which is executed by the central processing unit 1005. A program associated with this flowchart has been configured as the application 1121 and the OS 1131 and recorded in the storage medium, and is expanded by the volatile storage area 1004 and executed by the central processing unit 1005.

In FIG. 19, first, when an event in which the bitmap image should be displayed occurs in execution of the application 1121, the bitmap image obtaining command is received by the bitmap image loading section 1132, from the application 1121 (step S21). This obtaining command includes a resource ID indicating a file configuring the bitmap file 1126.

Next, the central processing unit 1005 obtains the bitmap image and the layout attribute flag 1142 associated with the above described resource ID from "bitmap format" within the specified bitmap file 1126, by the bitmap image loading section 1132 (step S22).

Next, the central processing unit 1005 determines whether or not the obtained layout attribute flag 1142 indicates "not dependent on the display layout", by the bitmap image loading section 1132 (step S23). As its result, if the obtained layout attribute flag 1142 indicates "not dependent on the display layout", the central processing unit 1005 directly returns the obtained bitmap image to the application 1121 without laterally reversing it (step S26), followed by terminating this process. The central processing unit 1005 performs the returning process in step S26 in cooperation with the bitmap image loading section 1132.

In the process in step S26 in this case, for example, the bitmap image 1082 showing the paper feeding method shown in FIG. 9B is returned without being laterally reversed, not depending on the kind of the currently selected language.

On the other hand, as a result of the determination in step S23, if the obtained layout attribute flag 1142 indicates "dependent on the display layout", the central processing unit 1005 performs the following process in cooperation with the bitmap image loading section 1132. In other words, the central processing unit 1005 retrieves the OS display language layout table 1171 of FIG. 18, based on the currently selected OS display language. Then, the central processing unit 1005 obtains "OS display layout information" matching the above described OS display language (step S24).

Next, the central processing unit 1005 determines contents of that "OS display layout information", by the bitmap image loading section 1132 (step S25) Then, if "OS display layout information" is "from left to right (forwarding)", the central processing unit 1005 directly returns the obtained bitmap image to the application 1121 without laterally reversing it (step S26), followed by terminating this process.

In the process in step S26 in this case, for example, if the currently selected language is English, the bitmap image associated with the black colored, right-pointing arrow shown in FIG. 9A is returned in a state of reference numeral 1093 of FIG. 11, without being laterally reversed.

On the other hand, as a result of the determination in step S25, if "OS display layout information" is "from right to left (reversal)", the central processing unit 1005 laterally reverses image data of the obtained bitmap format, returns it to the application 1121 (step S27), followed by terminating this process. The central processing unit 1005 performs the returning process in step S27 in cooperation with the bitmap image loading section 1132.

In the process in step S27 in this case, for example, if the currently selected language is Arabic, the bitmap image 1081 associated with the black colored, right-pointing arrow shown in FIG. 9A is laterally reversed, and returned in a state of reference numeral 1103 of FIG. 12.

In this way, in the third embodiment of the present invention, it is possible to laterally reverse the bitmap image, for example, associated with the arrow or the like, in the orientation corresponding to the reading direction of the language, and display the bitmap image on the application display screen 1122, through the process at the side of the operating system 1131.

It should be noted that the present invention is not limited to the above described first to third embodiments of the present invention, and for example, in the third embodiment of the present invention, it is also possible to prepare and use two bitmap images associated with the right-pointing arrow and the left-pointing arrow according to the second embodiment of the present invention. Moreover, processes similar to those according to the first to third embodiments of the present invention can also be applied to various applications other than the printer driver.

Moreover, in addition to the arrow, the present invention can also be applied to others, for example, a "Next" button, a volume display for a sound volume or the like, and information indicating the degree of progress in a currently performed process.

Furthermore, the present invention can also be applied to display objects other than the bitmap image, for example, a vector image.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-148221 filed May 29, 2006, which are hereby incorporated by reference herein in its entirety.

What is claimed is:

1. A display control apparatus comprising:
   an identifying unit adapted to identify a display language;
   a management unit adapted to manage determination information for determining whether or not a lateral orientation, or a lateral display position, or a lateral traveling direction for displaying objects associated with the display language identified by said identifying unit is changed depending on said display language, for each of said objects; and
   a determination unit adapted to determine the lateral orientation, or the lateral display position, or the lateral traveling direction with respect to said objects to be displayed, based on said display language identified by said identifying unit and said determination information managed by said management unit.

2. A display control apparatus as claimed in claim 1, wherein said identifying unit, said management unit and said determination unit are built on an application.

3. A display control apparatus as claimed in claim 1, wherein said identifying unit, said management unit and said determination unit are built on an operating system adapted to manage execution of an application.

4. A display control apparatus as claimed in claim 1, further comprising:
   a first storage unit adapted to store one object having only one direction of the lateral orientation, as said object indicating a direction, and
   a first display control unit adapted to, if a direction of a reverse orientation with respect to the direction stored in said first storage unit is determined by said determination unit with respect to the object stored in said first storage unit, read said object stored in said first storage unit and then display said read object in a laterally reversed manner.

5. A display control apparatus as claimed in claim 1, further comprising:

a second storage unit adapted to store two objects having a left direction and a right direction of the lateral orientation respectively, as said object indicating a direction, and a second display control unit adapted to read the object having a direction determined by said determination unit with respect to the objects stored in said second storage unit, from said second storage unit, and display the object.

6. A display control method comprising:

an identifying step of identifying a display language;

a management step of managing determination information for determining whether or not a lateral orientation, or a lateral display position, or a lateral traveling direction for displaying objects associated with the display language identified at said identifying step is changed depending on said display language, for each of said objects; and a determination step of determining the lateral orientation, or the lateral display position, or the lateral traveling direction with respect to said objects to be displayed, based on said display language identified at said identifying step and said determination information managed at said management step.

7. A tangible, non-transitory computer-readable storage medium storing a program for causing a computer to execute a display control method, said display control method comprising:

an identifying step of identifying a display language;

a management step of managing determination information for determining whether or not a lateral orientation, or a lateral display position, or a lateral traveling direction for displaying objects associated with the display language identified at said identifying step is changed depending on said display language, for each of said objects; and a determination step of determining the lateral orientation, or the lateral display position, or the lateral traveling direction with respect to said objects to be displayed, based on said display language identified at said identifying step and said determination information managed at said management step.

8. A display control apparatus comprising:

an identifying unit adapted to identify a display language;

a determination unit adapted to determine, for each of a plurality of objects, a lateral orientation, a lateral display position, or a lateral traveling direction of the respective object according to the display language identified by said identifying unit; and a display control unit adapted to display the plurality of objects in accordance with the respective lateral orientation, the lateral display position, or the lateral traveling direction determined by the determination unit.

9. A display control apparatus as claimed in claim 8, wherein said display language is identified as Arabic.

10. A display control method comprising:

an identifying step of identifying a display language;

a determination step of determining, for each of a plurality of objects, a lateral orientation, a lateral display position, or a lateral traveling direction of the respective object according to the display language identified by said identifying step; and a display control step of displaying the plurality of objects in accordance with the respective lateral orientation, the lateral display position, or the lateral traveling direction determined by the determination step.

11. A tangible, non-transitory computer-readable storage medium storing a program for causing a computer to execute a display control method, said display control method comprising:

an identifying step of identifying a display language;

a determination step of determining, for each of a plurality of objects, a lateral orientation, a lateral display position, or a lateral traveling direction of the respective object according to the display language identified by said identifying step; and a display control step of displaying the plurality of objects in accordance with the respective lateral orientation, the lateral display position, or the lateral traveling direction determined by the determination step.

* * * * *

UNITED STATES PATENT AND TRADEMARK OFFICE
CERTIFICATE OF CORRECTION

PATENT NO.        : 7,843,443 B2                                         Page 1 of 1
APPLICATION NO.   : 11/754404
DATED             : November 30, 2010
INVENTOR(S)       : Oki It is certified that error appears in the above-identified patent and that said Letters Patent is hereby corrected as shown below:

Title Page
In Section (30) Foreign Application Priority Data field correct an error in the Foreign Application Priority Data as follows:

INSERT -- May 29, 2006   (JP)   ........................ 2006-148221 --

Signed and Sealed this
First Day of March, 2011

David J. Kappos
*Director of the United States Patent and Trademark Office*